US012600000B2

(12) United States Patent
Tsuruta

(10) Patent No.: US 12,600,000 B2
(45) Date of Patent: Apr. 14, 2026

(54) WORKPIECE CONVEYING WHEELED PLATFORM AND WORKING SYSTEM

(71) Applicant: AMADA CO., LTD., Kanagawa (JP)

(72) Inventor: Hiroki Tsuruta, Kanagawa (JP)

(73) Assignee: AMADA CO., LTD., Kanagawa (JP)

( * ) Notice: Subject to any disclaimer, the term of this patent is extended or adjusted under 35 U.S.C. 154(b) by 589 days.

(21) Appl. No.: 18/018,463

(22) PCT Filed: Aug. 12, 2021

(86) PCT No.: PCT/JP2021/029704
§ 371 (c)(1),
(2) Date: Jan. 27, 2023

(87) PCT Pub. No.: WO2022/039096
PCT Pub. Date: Feb. 24, 2022

(65) Prior Publication Data
US 2023/0286094 A1 Sep. 14, 2023

(30) Foreign Application Priority Data

Aug. 19, 2020 (JP) ................................. 2020-138692

(51) Int. Cl.
*B23Q 7/16* (2006.01)
*B21D 43/24* (2006.01)
*B30B 15/30* (2006.01)

(52) U.S. Cl.
CPC .............. *B23Q 7/16* (2013.01); *B21D 43/24* (2013.01); *B30B 15/30* (2013.01)

(58) Field of Classification Search
CPC . B23Q 7/16; B21D 43/24; B21D 5/00; B21D 43/105; B21D 43/13; B30B 15/30;
(Continued)

(56) References Cited

U.S. PATENT DOCUMENTS 5,190,434 A * 3/1993 Miura ................... B65G 65/00
414/416.11
8,919,360 B1 * 12/2014 Ransley ................... B08B 3/02
134/198
(Continued)

FOREIGN PATENT DOCUMENTS

CN          102416961 A      4/2012
CN          102408011 B      8/2013
(Continued)

OTHER PUBLICATIONS

International Search Report for corresponding Application No. PCT/JP2021/029704, mailed Nov. 2, 2021.
(Continued)

*Primary Examiner* — Gene O Crawford
*Assistant Examiner* — Abby A Jorgensen
(74) *Attorney, Agent, or Firm* — Renner, Otto, Boisselle & Sklar, LLP

(57) ABSTRACT

A slider configured to move in a predetermined direction between a setup area and a pickup area is provided in a vicinity of a loading machine that supplies a workpiece W to a working machine. The slider is recessed to form a placing part for placing a pallet. Guide mechanisms for supporting the slider so as to be movable in the predetermined direction are respectively arranged on both sides in a lateral direction orthogonal to the predetermined direction in the placing part of the slider. A drive mechanism for moving the slider in the predetermined direction is arranged on at least one side in the lateral direction of the placing part.

6 Claims, 8 Drawing Sheets

(58) Field of Classification Search
CPC ........ B65G 69/22; B65G 65/00; B65G 25/06; B65D 19/0016; B65D 2519/00333
See application file for complete search history.

(56) References Cited

U.S. PATENT DOCUMENTS

| | | | |
|---|---|---|---|
| 10,576,621 B2 | 3/2020 | Wagner et al. | |
| 11,402,831 B2 | 8/2022 | Wagner et al. | |
| 2012/0076631 A1 | 3/2012 | Wang et al. | |
| 2014/0244026 A1* | 8/2014 | Neiser ................. | B65G 1/1378 |
| | | | 700/216 |
| 2017/0304972 A1* | 10/2017 | Kato ...................... | B23Q 1/626 |
| 2018/0282066 A1* | 10/2018 | Wagner ............... | B65G 1/0485 |
| 2019/0256296 A1* | 8/2019 | Akiyama .............. | B65G 35/00 |
| 2020/0078938 A1* | 3/2020 | Bradski ................. | G06V 20/64 |
| 2020/0147788 A1 | 5/2020 | Wagner et al. | |
| 2020/0198077 A1* | 6/2020 | Andujo ............... | B21D 43/105 |
| 2021/0354920 A1 | 11/2021 | Zhan et al. | |

FOREIGN PATENT DOCUMENTS

| | | | | | |
|---|---|---|---|---|---|
| CN | 107054960 A | | 8/2017 | | |
| DE | 102019101310 A1 | | 7/2020 | | |
| JP | 11300441 A | * | 11/1999 | | |
| JP | 2001113392 A | * | 4/2001 | | |
| JP | 2017024140 A | * | 2/2017 | ............. | B23P 19/00 |
| JP | 2017-124469 A | | 7/2017 | | |
| JP | 2017-149496 A | | 8/2017 | | |
| JP | 2018126794 A | * | 8/2018 | | |
| JP | 2019-206036 A | | 12/2019 | | |
| WO | 8606054 A1 | | 10/1986 | | |
| WO | WO-2006059708 A1 | * | 6/2006 | ........... | B65G 1/0407 |
| WO | WO-2009071072 A2 | * | 6/2009 | ............. | B65G 65/00 |
| WO | WO-2014136541 A1 | * | 9/2014 | ............. | B21D 43/24 |
| WO | 2018175770 A1 | | 9/2018 | | |
| WO | WO-2018234393 A1 | * | 12/2018 | ........ | B65D 19/0038 |
| WO | 2020156393 A1 | | 8/2020 | | |

OTHER PUBLICATIONS

Extended European Search report for corresponding EP Application No. 21858243.5 dated Jan. 22, 2024.

* cited by examiner

WORKPIECE CONVEYING WHEELED PLATFORM AND WORKING SYSTEM

TECHNICAL FIELD

The present invention relates to a workpiece conveying wheeled platform that conveys a plurality of stacked workpieces in a predetermined direction, and a working system that continuously processes the plurality of workpieces.

BACKGROUND ART

A bending system as an example of a working system includes a press brake that bends a workpiece and a loading machine that is provided in a vicinity of the press brake and supplies the workpiece to the press brake. The bending system includes a workpiece conveying wheeled platform that conveys the stacked workpieces from a setup area to a pickup area in a predetermined direction. The setup area is an area for setting up the stacked workpieces, and the pickup area is an area for picking up an uppermost workpiece in the workpieces stacked by the loading machine.

The workpiece conveying wheeled platform includes a slider that moves in the predetermined direction between the setup area and the pickup area, and the slider includes a placing table for placing the plurality of workpieces directly or via a pallet. In addition, a pair of guide mechanisms that support the slider so as to be movable in the predetermined direction are arranged below the placing table of the slider, and the pair of guide mechanisms are separated in the lateral direction orthogonal to the predetermined direction. A drive mechanism for moving the slider in the predetermined direction is arranged below the placing table of the slider. The drive mechanism is provided below the placing table of the slider and includes an electric motor for moving the slider in the predetermined direction. The drive mechanism includes a rack member that is provided, on part of an installation surface on a floor, below the placing table of the slider, and extends in the predetermined direction, and a pinion that is connected to an output shaft of the electric motor and is engaged with the rack member.

Note that the prior arts related to the present invention are shown in Patent Literatures 1 to 3 described below.

CITATION LIST

Patent Literature

Patent Literature 1: Japanese Patent Application Laid-Open Publication No. 2019-206036
Patent Literature 2: Japanese Patent Application Laid-Open Publication No. 2017-124469
Patent Literature 3: Japanese Patent Application Laid-Open Publication No. 2017-149496

SUMMARY

Now, in order to properly pick up the uppermost workpiece with the loading machine, it is necessary to suppress the stacking height of the workpieces on the workpiece conveying wheeled platform to be equal to or less than a predetermined height because the stacking height of the workpieces has an upper limit relative to the installation surface on the floor. In addition, since the guide mechanisms and the drive mechanism are arranged under the placing table of the slider, the height from the installation surface on the floor to the upper surface of the placing table of the slider increases, and the number of stacked sheets of the workpieces on the workpiece conveying wheeled platform is limited for that amount. As a result, the frequency of setting up the workpieces for the workpiece conveying wheeled platform increases, and thus improvement in workability has been desired.

Note that when the workpieces are directly stacked on the placing table of the slider, the stacking capacity of the workpieces can be increased by the height of the pallet. However, this makes the work of setting up the workpieces a complete manual work, which makes the working time long.

Therefore, an object of the present invention is to provide a workpiece conveying wheeled platform and a working system capable of reducing the frequency of setting up workpieces and improving workability.

According to a first aspect of the present invention, there is provided a workpiece conveying wheeled platform, which includes a slider (a wheeled platform main body) provided in a vicinity of a loading machine for supplying a workpiece to a working machine, the slider being movable in a predetermined direction between a setup area (setting area) for setting up (setting) a plurality of workpieces stacked on a pallet and a pickup area for picking up an uppermost workpiece from among the plurality of workpieces with the loading machine, the slider being recessed to form a placing part for placing the pallet, guide mechanisms respectively arranged on both sides in a lateral direction orthogonal to the predetermined direction in the placing part of the slider and configured to support the slider so as to be movable in the predetermined direction, and a drive mechanism arranged on at least one side in the lateral direction of the placing part of the slider and configured to move the slider in the predetermined direction.

A recessed depth of the placing part of the slider may be set to a depth corresponding to a height of the pallet.

The placing part of the slider may be close to an installation surface on a floor.

In this case, a notch for allowing a fork of a pallet jack to enter may be formed on the placing part of the slider.

The workpiece conveying wheeled platform may further include an auxiliary roller provided to the placing part of the slider and configured to roll on the installation surface on the floor.

The guide mechanisms include a pair of a first guide mechanism and a second guide mechanism, in which the first guide mechanism may include a first guide rail provided, on part of the installation surface on the floor, on one side in the lateral direction of the placing part of the slider and extending in the predetermined direction, and a guide block provided on the one side in the lateral direction of the placing part of the slider and configured to be guided by the first guide rail so as to be movable in the predetermined direction, and the second guide mechanism may include a second guide rail provided, on part of the installation surface on the floor, on another side in the lateral direction of the placing part of the slider and extending in the predetermined direction, and a guide roller provided on the other side in the lateral direction of the placing part of the slider and configured to roll on the second guide rail in the predetermined direction.

According to a second aspect of the present invention, there is provided a working system, which includes a working machine configured to process a workpiece, a loading machine configured to supply the workpiece to the working machine, and the workpiece conveying wheeled platform according to the first aspect.

DESCRIPTION OF EMBODIMENT

Figure 1:
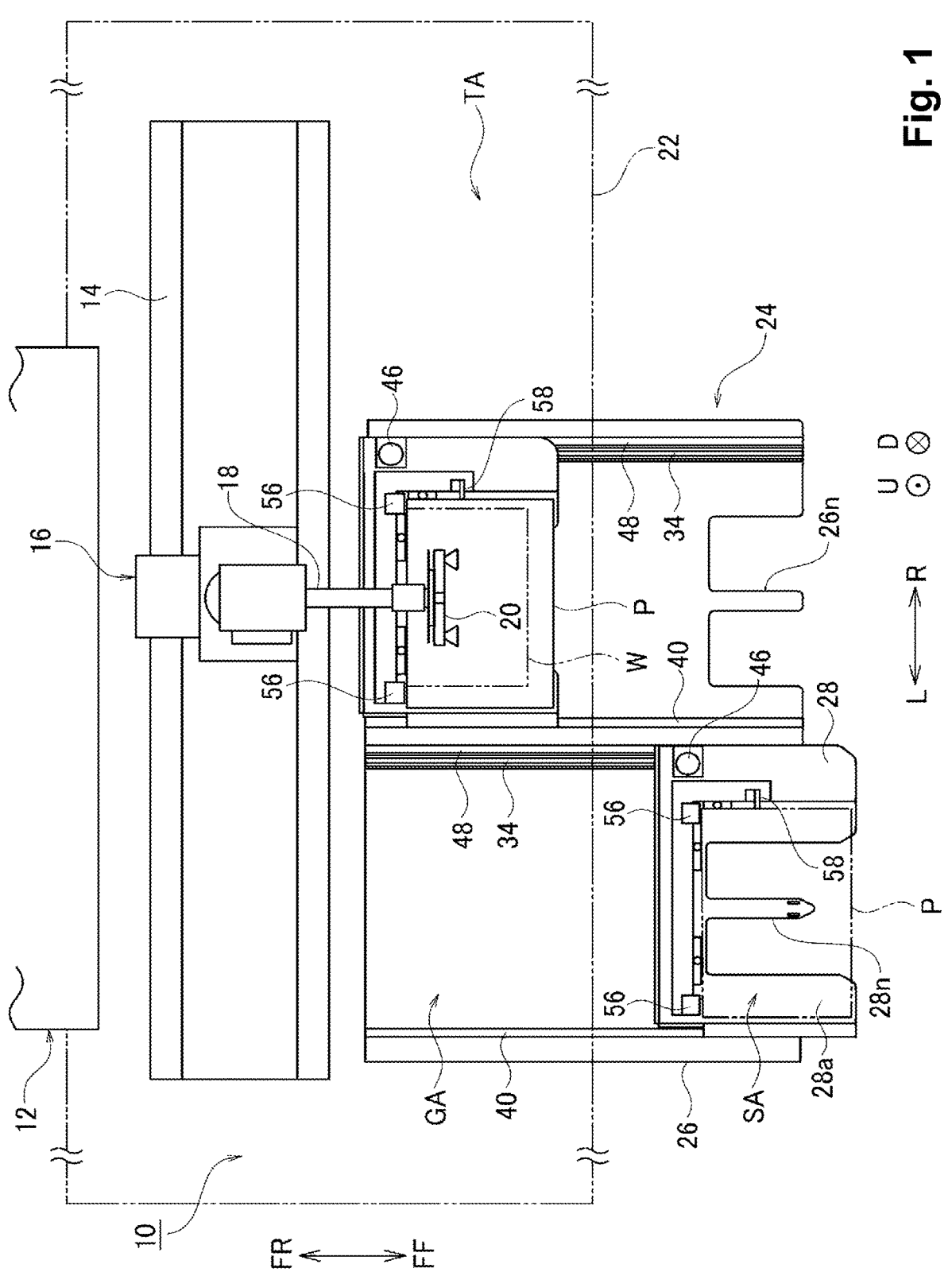
FIG. 1 is a schematic plan view of a bending system according to an embodiment.
Figure 2:
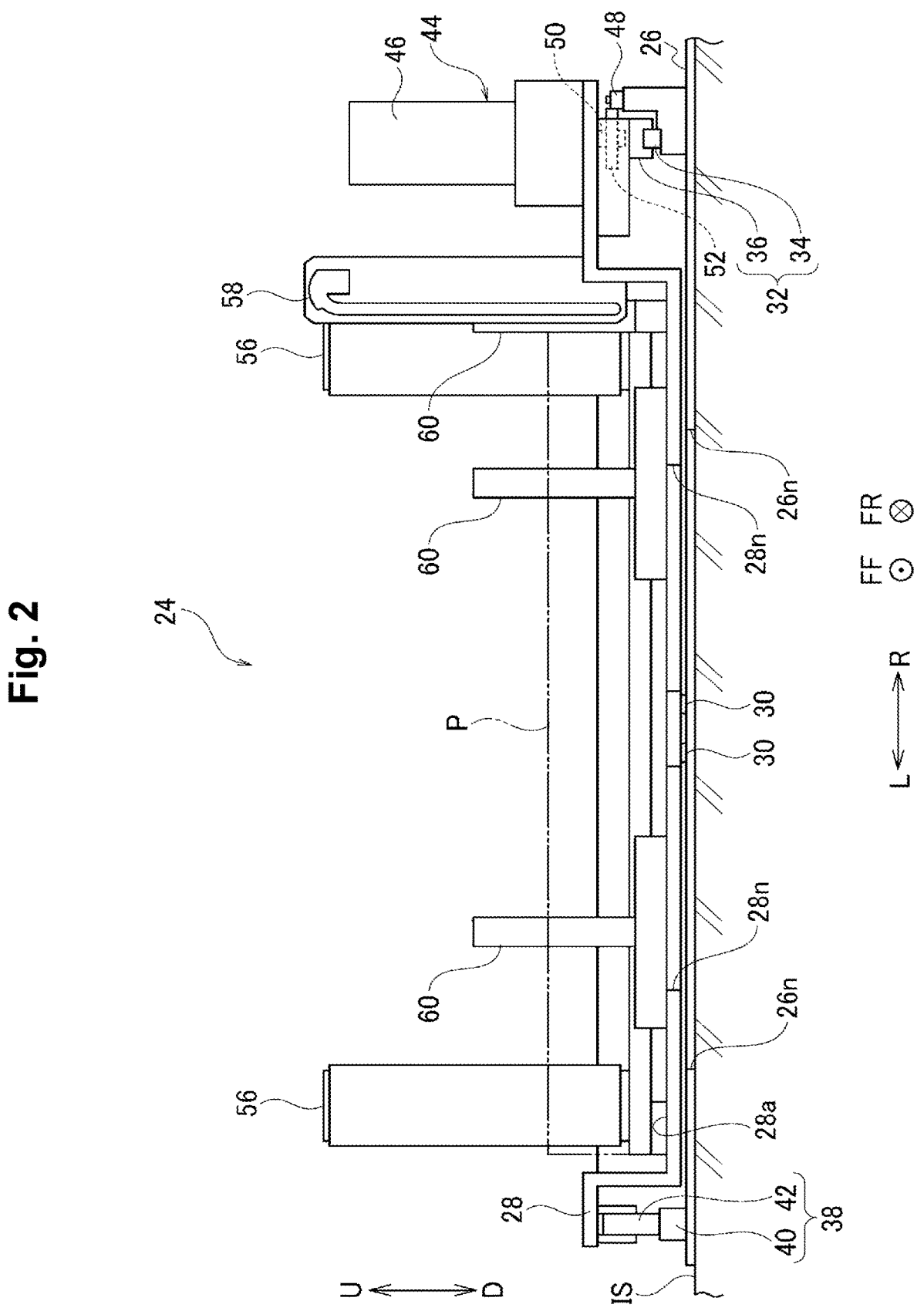
FIG. 2 is a front view showing a left half of a workpiece conveying wheeled platform according to the embodiment.
Figure 3:
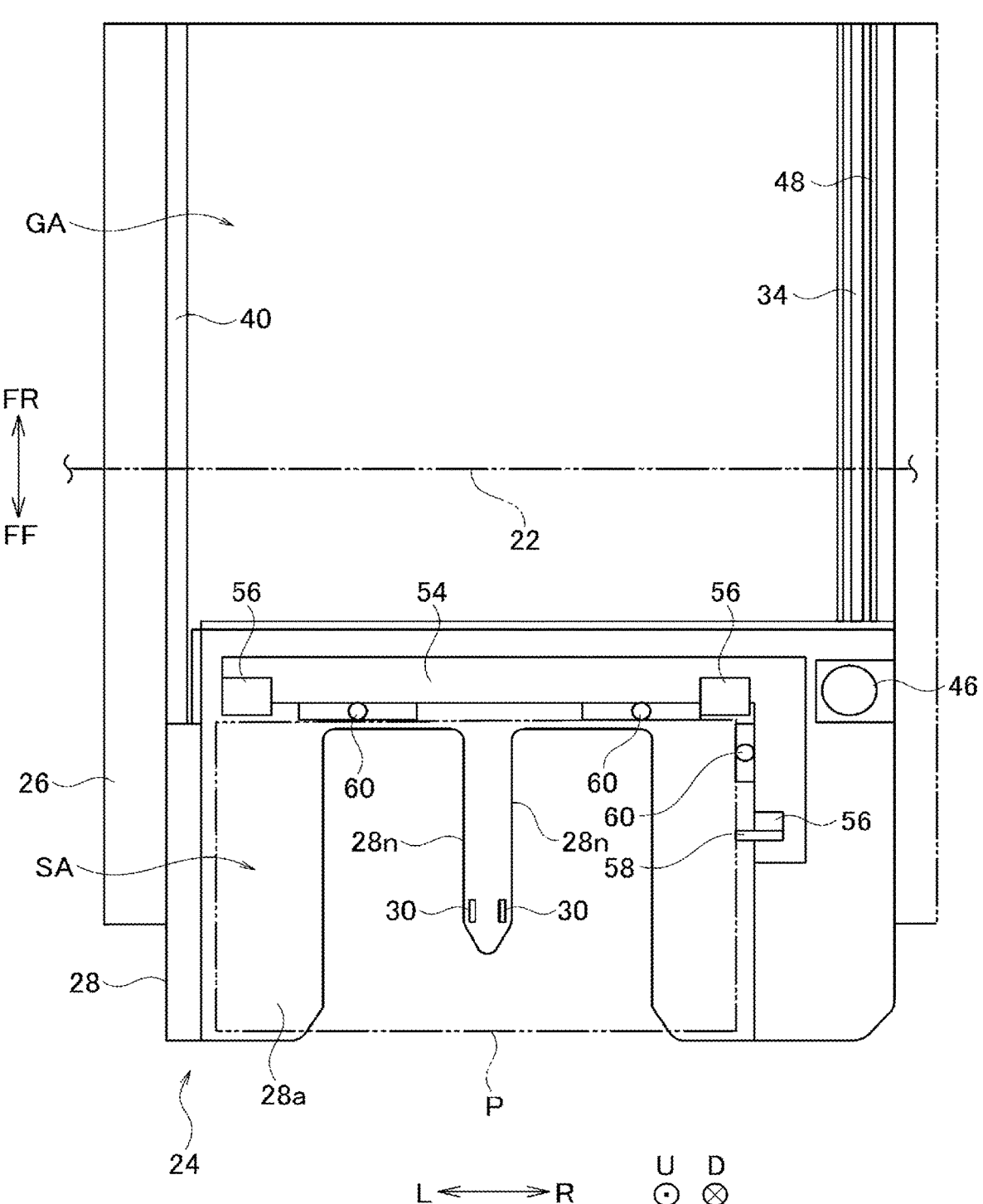
FIG. 3 is a plan view showing the left half of the workpiece conveying wheeled platform.
Figure 4:
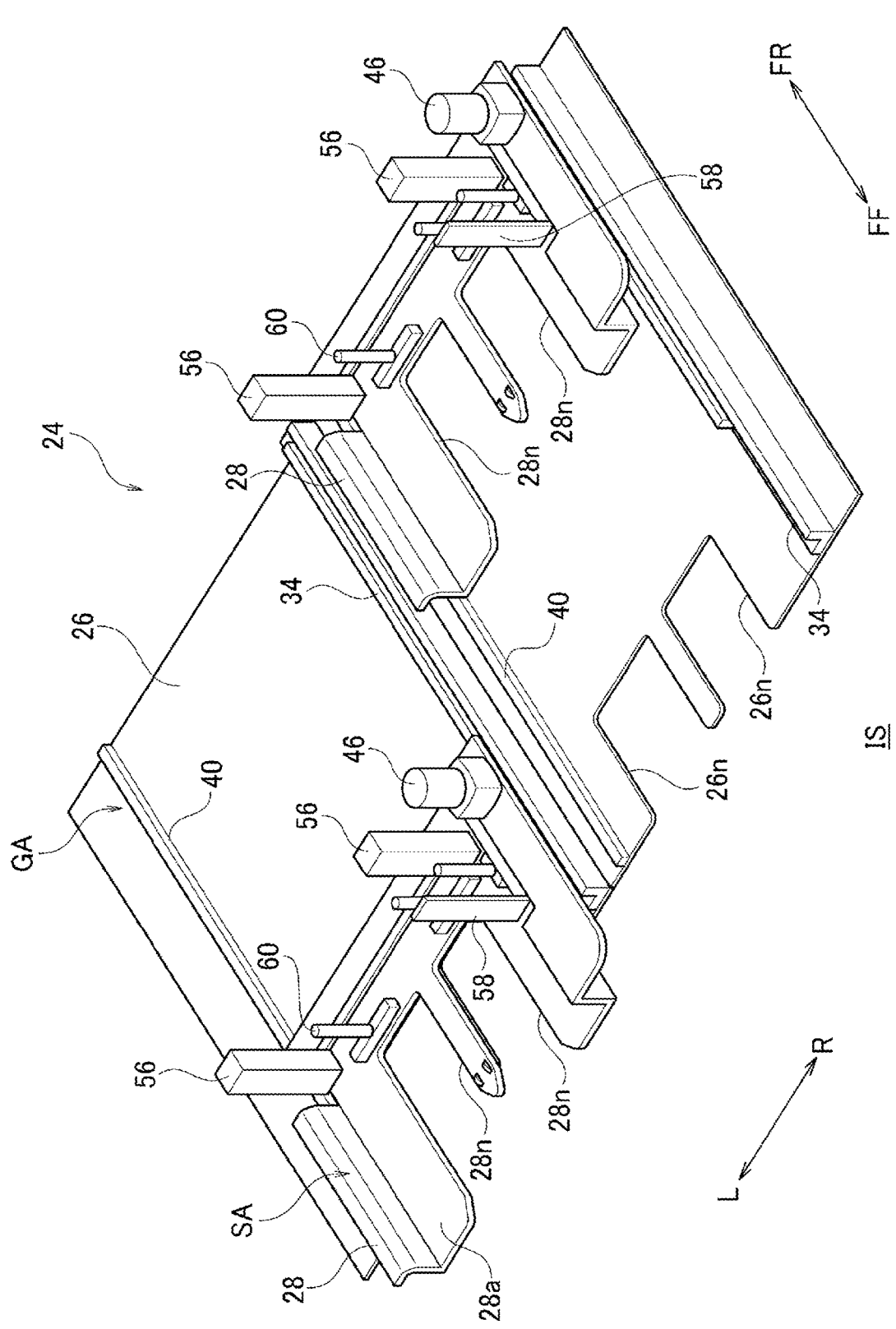
FIG. 4 is a perspective view showing the workpiece conveying wheeled platform.

An embodiment will be described with reference to FIGS. 1 to 5D.

Note that the "front-rear direction" is one of the horizontal directions, and is the direction in which a workpiece is conveyed by a workpiece conveying wheeled platform. The "left-right direction" is a horizontal direction orthogonal to the front-rear direction, and is a lateral direction of the workpiece conveying wheeled platform or a press brake. In the drawings, "FF", "FR", "L", "R", "U" and "D" indicate a forward direction, a backward direction, a left direction, a right direction, an upward direction, and a downward direction, respectively.

As shown in FIG. 1, a bending system 10 according to the present embodiment is a working system that continuously bends a plate-shaped workpiece (a sheet metal) W. The bending system 10 includes a press brake 12 as a working machine that bends the workpiece W by a collaboration between a punch tool (not shown) and a die tool (not shown).

A guide frame 14 extending in the left-right direction is provided in a vicinity of a front of the press brake 12. The guide frame 14 includes a bending robot 16, so as to be movable in the left-right direction, as a loading machine for supplying the workpiece W to the press brake 12. In other words, the bending robot 16 is provided in the vicinity of the front of the press brake 12 so as to be movable in the left-right direction via the guide frame 14. In addition to supplying the workpiece W to the press brake 12, the bending robot 16 assists in bending the workpiece W. The bending robot 16 carries out a bent product (not shown) to a product pallet (not shown) that is arranged in a carry-out area TA on the right front side of the guide frame 14. The bending robot 16 has a publicly known configuration, for example, shown in Patent Literature 2, and includes an articulated robot arm 18 and a robot hand 20, which is provided at the distal end of the robot arm 18 and used as a workpiece suction unit for sucking the workpiece W.

A safety fence 22 for ensuring safety in bending the workpiece W is provided in a periphery of the operating range of the bending robot 16. The safety fence 22 includes a plurality of doors (not shown) for allowing a pallet jack HL (see FIG. 5C) or a forklift (not shown) to pass.

In a vicinity of a front of the bending robot 16, a workpiece conveying wheeled platform 24 for conveying the workpiece W from a setup area (a setting area) SA to a pickup area GA along the front-rear direction, which is the predetermined direction, is provided. The setup area SA is positioned outside the safety fence 22 and is an area for setting up (setting) the workpieces W stacked on the pallet P. The pickup area GA is positioned inside the safety fence 22 and is an area for sucking and picking up an uppermost workpiece W from among a plurality of the workpieces W with the bending robot 16 (the robot hand 20). Then, the specific configuration of the workpiece conveying wheeled platform 24 is as follows.

As shown in FIGS. 1 to 4, a base plate (an attachment plate) 26 extending in the left-right direction (the lateral direction) is installed in the vicinity of the front of the bending robot 16, and the upper surface of the base plate 26 corresponds to an installation surface IS on a floor. The front side portion of the base plate 26 is positioned outside the safety fence 22, and the rear side portion of the base plate 26 is positioned inside the safety fence 22. Notches 26$n$ for two wheels for allowing wheels HLb on the distal end of forks HLa of the pallet jack HL to enter are formed on the front end side of the right side portion and the front end side of the left side portion of the base plate 26, respectively.

Sliders (wheeled platform main bodies) 28 that move in the front-rear direction between the setup area SA and the pickup area GA are provided on the upper side of the left side portion and the upper side of the right side portion of the base plate 26, respectively. Each of the sliders 28 is recessed downward to form a placing part 28$a$ for placing the pallet P thereon. The upper surface and the lower surface of the placing part 28$a$ of the slider 28 are formed as flat surfaces. The lower surface of the placing part 28$a$ is close to the upper surface of the base plate 26 that corresponds to the installation surface IS on the floor. The recessed depth of the placing part 28$a$ is set to a depth corresponding to a height of the pallet P, for example, set to a depth equal to the height of the pallet P. In addition, on the front end side of the placing part 28$a$, notches 28$n$ for the two forks for allowing the forks HLa of the pallet jack HL to enter are formed. The notch 28$n$ is matched to the notch 26$n$ of the base plate 26.

Note that the recessed depth of the placing part 28$a$ does not necessarily have to be set to the depth equal to the height of the pallet P as long as it is set to the depth corresponding to the height of the pallet P.

A plurality of auxiliary rollers 30 (see FIG. 3) that roll on the upper surface of the base plate 26 are rotatably provided at the center portion in the left-right direction (the lateral direction) of the placing part 28$a$. As a result, the lower surface of the placing part 28$a$ can be brought closer to the upper surface of the base plate 26 without bringing the slider 28 into contact with the base plate 26.

Note that the auxiliary rollers 30 may be rotatably provided on both end sides in the left-right direction of the placing part 28$a$. An intermediate plate (not shown) harder than the base plate 26 or a flat roller cage (not shown) may be interposed between the base plate 26 and the slider 28.

A first guide mechanism 32 that supports the slider 28 so as to be movable in the front-rear direction is arranged on the right side (one side in the lateral direction) of the placing part 28$a$. Specifically, a first guide rail 34 extending in the front-rear direction is provided, on part of the upper surface of the base plate 26, on the right side of the placing part 28$a$. In addition, a guide block 36 that is guided by the first guide rail 34 and is movable in the front-rear direction is provided on the right side of the placing part 28$a$. The movement of the guide block 36 is restricted in the left-right direction with respect to the first guide rail 34.

A second guide mechanism 38 that supports the slider 28 so as to be movable in the front-rear direction is arranged on the left side (the other side in the lateral direction) of the placing part 28a. Specifically, a second guide rail 40 extending in the front-rear direction is provided, on part of the upper surface of the base plate 26, on the left side of the placing part 28a. A guide roller 42 that rolls on the second guide rail 40 is rotatably provided on the left side of the placing part 28a.

Note that in lieu of the guide roller 42, the second guide mechanism 38 may include a guide block that is provided on the left side of the placing part 28a, is guided by the second guide rail 40, and is movable in the front-rear direction.

A drive mechanism 44 for moving the slider 28 in the front-rear direction is arranged on the right side of the placing part 28a. Specifically, a geared motor 46, which is a type of an electric motor as a moving actuator, is provided on the right side of the placing part 28a. A rack member 48 extending in the front-rear direction is provided, on part of the upper surface of the base plate 26, on the right side of the placing part 28a. A pinion 52 that is engaged with the rack member 48 is connected to an output shaft 50 of the geared motor 46.

Note that the drive mechanism 44 may include an electric motor other than the geared motor 46. In lieu of the rack member 48 and the pinion 52, the drive mechanism 44 may include a ball screw extending in the front-rear direction and a nut member screwed into the ball screw. The drive mechanism 44 may include a hydraulic cylinder as a moving actuator in lieu of the electric motor such as the geared motor 46. Instead of arranging the drive mechanism 44 on the right side of the placing part 28a, another driving mechanism for moving the slider 28 in the front-rear direction may be arranged on the left side or both of the left and right sides of the placing part 28a.

A first stopper (not shown) and a second stopper (not shown) are provided, on part of the upper surface of the base plate 26, at appropriate positions on the left side of the placing part 28a, so as to be separated in the front-rear direction. The first stopper prevents the slider 28 from moving forward beyond a predetermined position of the setup area SA. The second stopper prevents the slider 28 from moving backward beyond a predetermined position of the pickup area GA. In addition, a first sensor (not shown) and a second sensor (not shown) are provided, on part of the upper surface of the base plate 26, at appropriate positions on the right side of the placing part 28a, so as to be separated in the front-rear direction. The first sensor detects that the slider 28 is positioned at the predetermined position of the setup area SA. The second sensor detects that the slider 28 is positioned at the predetermined position of the pickup area GA. Further, a cable carrier (not shown) and a cable duct (not shown) are arranged, on part of the upper surface of the base plate 26, at appropriate positions on the right side of the placing part 28a.

A placing plate 54 having an L shape in a plan view is provided from the rear portion to the right portion of the placing part 28a. A plurality of magnet floaters 56 are erected on the placing plate 54. The magnet floaters 56 levitate, by magnetic force, the uppermost workpiece W from among the plurality of workpieces W stacked on the pallet P. The magnet floater 56 has a publicly known configuration shown in Patent Literature 3. In addition, an air separator 58 is provided on the side portion of any of the magnet floaters 56. The air separator 58 separates, by jet pressure of air, the uppermost workpiece W from among the plurality of workpieces W stacked on the pallet P. The air separator 58 has a publicly known configuration shown in Patent Literature 3. A plurality of abutting posts 60 against which the pallet P can be abutted are erected in a vicinity of the placing plate 54 in the placing part 28a.

Note that the placing plate 54 may be provided to the base plate 26 instead of being provided to the placing part 28a. When the uppermost workpiece W is picked up by using a camera (not shown) that captures an image of the uppermost workpiece W from above, the plurality of magnet floaters 56 and the air separator 58 may be omitted from the configuration of the workpiece conveying wheeled platform 24.

A plurality of shutters (not shown) for opening and closing a part of the safety fence 22 are provided on the upper surface of the base plate 26. Each of the shutters is configured to switch the setup area SA and the pickup area GA from a communication state to a cutoff state when the slider 28 is moved in the front-rear direction. The communication state is a state in which the setup area SA and the pickup area GA are in communication. The cutoff state is a state in which the setup area SA and the pickup area GA are cut off.

Subsequently, the overall operation of the bending system 10 and the particular effect of the workpiece conveying wheeled platform 24 will be described.

[Overall Operation of Bending System 10]

Figure 5A:
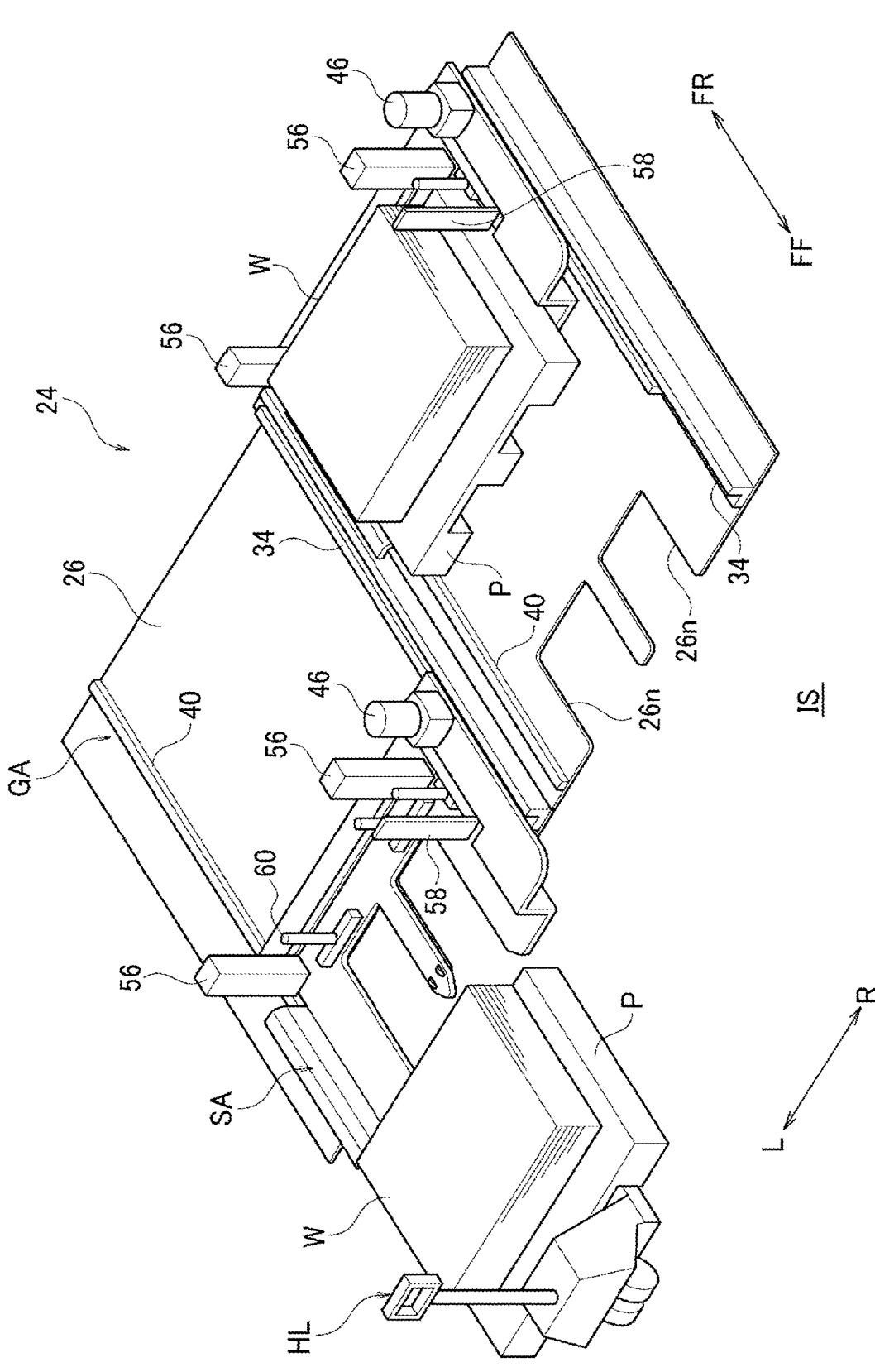
FIG. 5A is a perspective view showing an operation of the workpiece conveying wheeled platform.

As shown in FIGS. 1 and 5A, with the slider 28 on the right side being positioned in the pickup area GA, the bending robot 16 picks up the uppermost workpiece from the workpieces W that are stacked, via the pallet P, on the placing part 28a of the slider 28 on the right side. Next, the bending robot 16 supplies the workpiece W, which is picked up, to the press brake 12. Then, with the bending robot 16 assisting in bending the workpiece W, the workpiece W is bent by the collaboration between the punch tool and the die tool of the press brake 12. Further, the bending robot 16 carries out the bent product to the product pallet. By repeating the operation described above, the workpieces W stacked via the pallet P on the placing part 28a of the slider 28 on the right side are continuously bent.

Figure 5B:
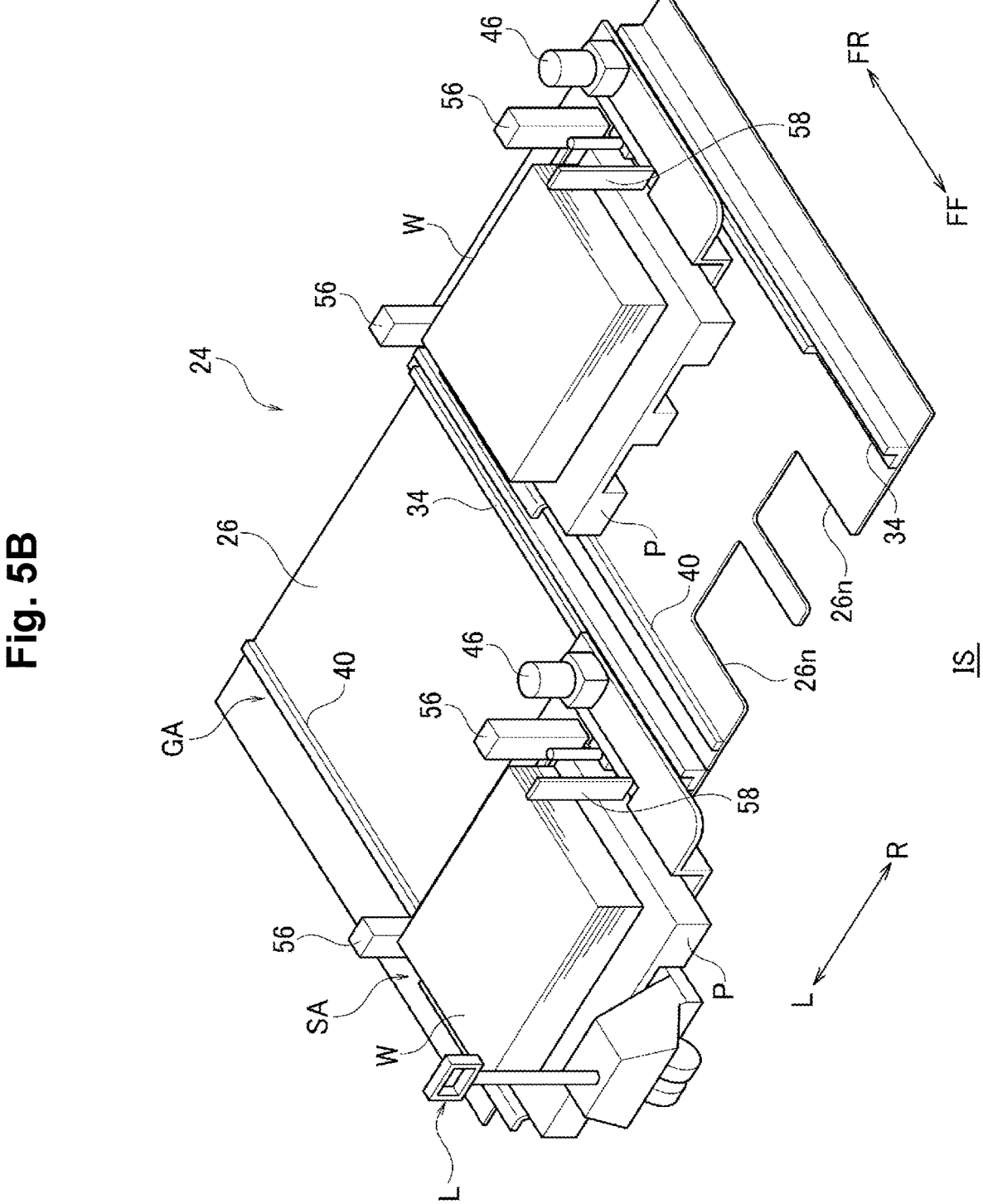
FIG. 5B is a perspective view showing an operation of the workpiece conveying wheeled platform.
Figure 5C:
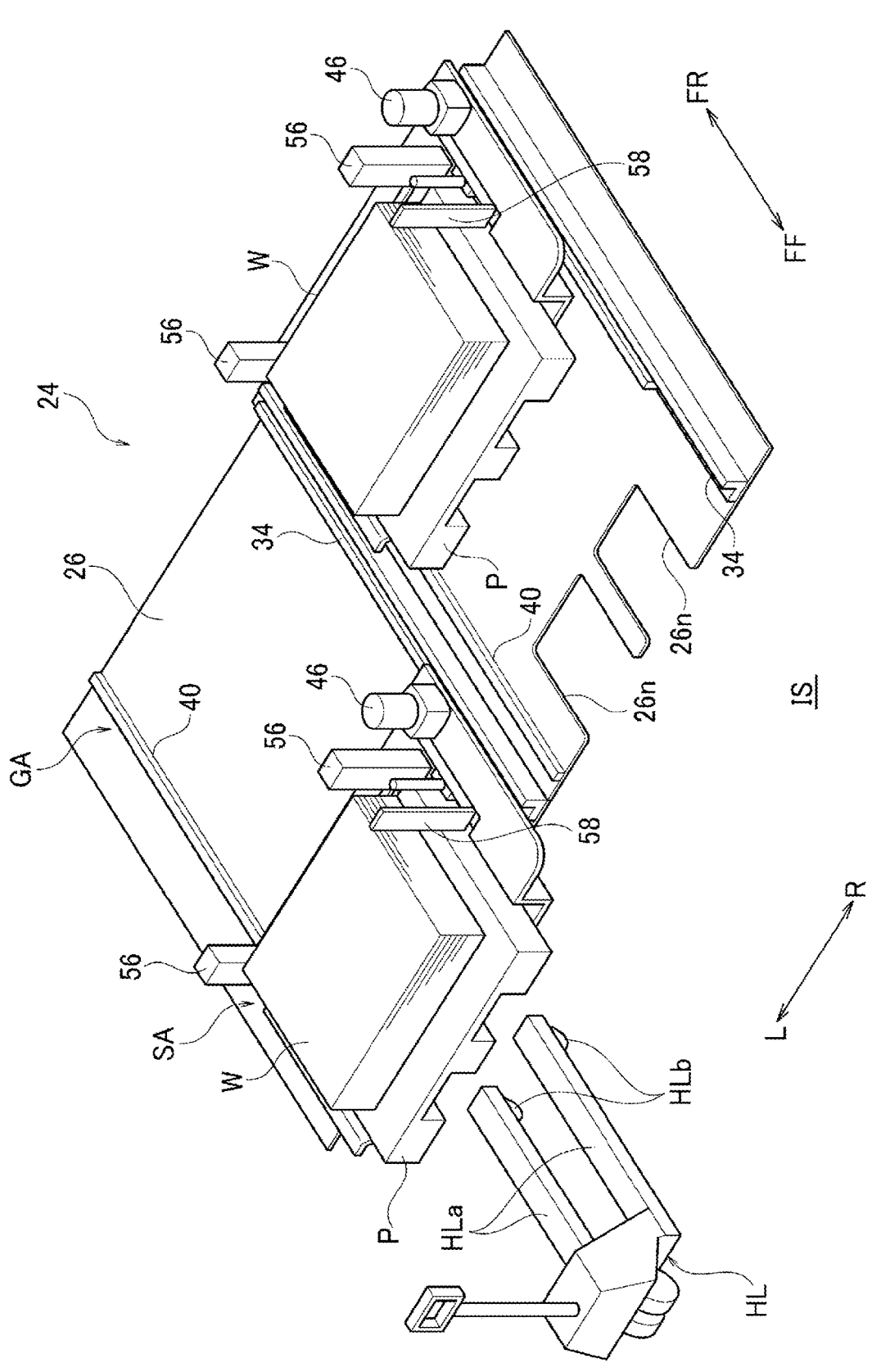
FIG. 5C is a perspective view showing an operation of the workpiece conveying wheeled platform.
Figure 5D:
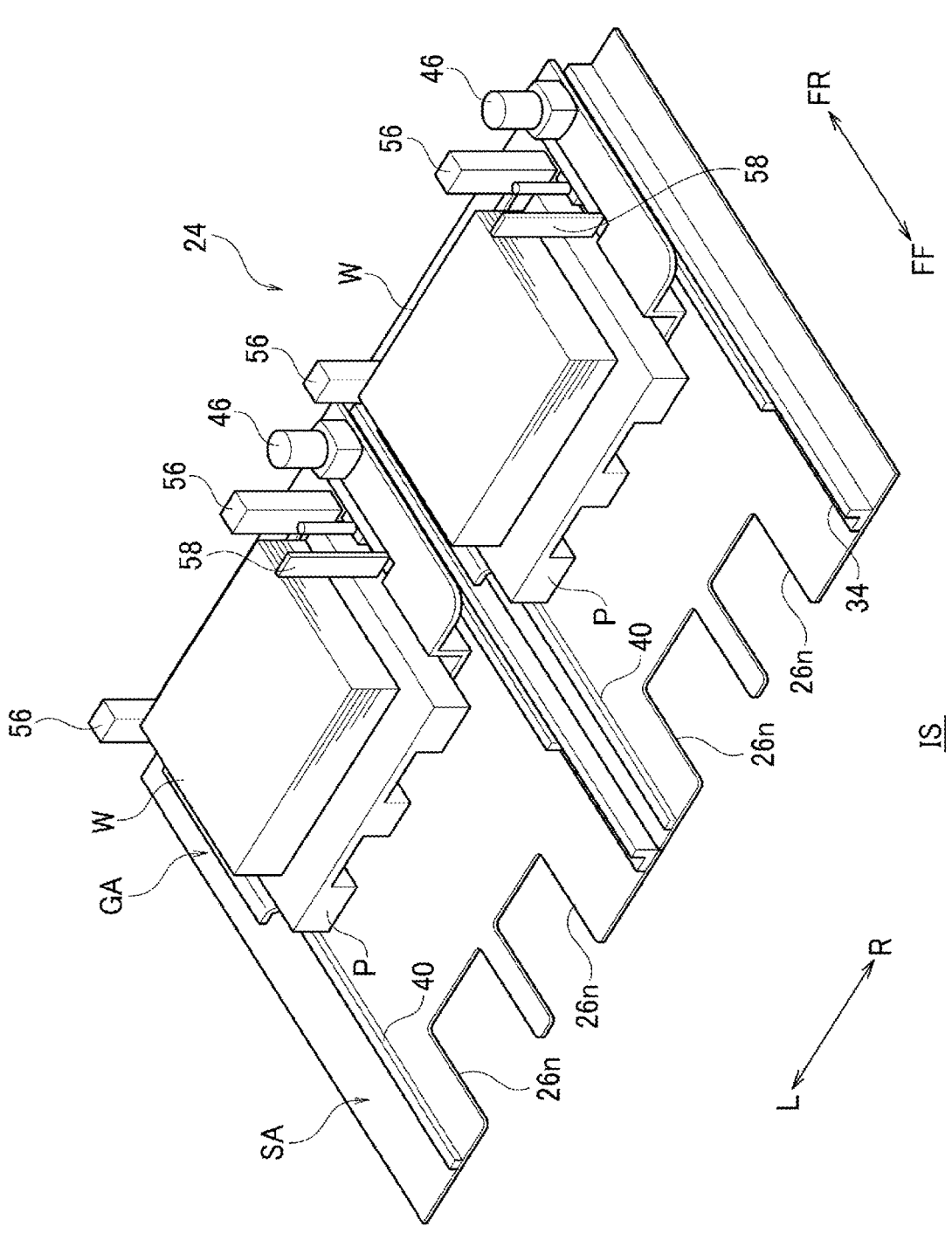
FIG. 5D is a perspective view showing an operation of the workpiece conveying wheeled platform.

In the meantime, as shown in FIG. 5B, with the slider 28 on the left side being positioned in the setup area SA, the pallet P on which the workpieces W are stacked by the pallet jack HL is moved backward and positioned above the placing part 28a of the slider 28 on the left side. Next, by lowering the forks HLa of the pallet jack HL to place the pallet P on the placing part 28a on the left side, the workpieces W stacked on the pallet P are set up. Further, as shown in FIG. 5C, the pallet jack HL is moved forward to be separated from the left slider 28. Then, as shown in FIG. 5D, the pinion 52 on the left side (see FIG. 2) is rotated in the positive direction by driving the geared motor 46 on the left side so that the slider 28 on the left side is moved from the setup area SA to the pickup area GA. In this manner, the workpieces W stacked via the pallet P on the placing part 28a of the slider 28 on the left side are prepared to be bent.

Note that when the workpieces W stacked on the pallet P placed on the placing part 28a of the slider 28 on the left side are continuously bent, the same operation as that of the bending process on the right side, which is described above, is executed. In addition, when the workpieces W stacked on the pallet P placed on the placing part 28a of the slider 28 on the right side are prepared to be bent, the same operation as that of the preparation on the left side, which is described above, is executed.

[Particular Effect of Workpiece Conveying Wheeled Platform 24]

In the configuration of the workpiece conveying wheeled platform 24, as described above, the slider 28 is recessed downward to form the placing part 28a for placing the pallet P. In addition, the recessed depth of the placing part 28a is set to the depth corresponding to the height of the pallet P. The first guide mechanism 32 and the drive mechanism 44 are respectively arranged on the right side of the placing part 28a, and the second guide mechanism 38 is arranged on the left side of the placing part 28a. As a result, it is possible to lower the height from the upper surface of the base plate 26, which corresponds to the installation surface IS on the floor, to the upper surface of the placing part 28a. Accordingly, it is possible to increase the stacking capacity of the workpieces W in the workpiece conveying wheeled platform 24. According to the present embodiment, it is possible to reduce the frequency of setting up the workpieces W for the workpiece conveying wheeled platform 24 so as to enhance the workability.

In addition, in the configuration of the workpiece conveying wheeled platform 24, the lower surface of the placing part 28a is close to the upper surface of the base plate 26 as described above. The notches 28n for the two forks HLa are formed on the front end side of the placing part 28a. Therefore, when the pallet P is placed on the placing part 28a or the pallet P is picked up from the placing part 28a, the amount of a vertical movement of the forks HLa can be reduced. Therefore, according to the present embodiment, the workpiece W can be set up by using the simple pallet jack HL having a small capable amount of the vertical movement of the forks HLa.

Further, in the configuration of the workpiece conveying wheeled platform 24, as described above, the guide block 36 that is guided by the first guide rail 34 so as to be movable in the front-rear direction is provided on the right side of the placing part 28a. The guide roller 42 that rolls on the second guide rail 40 is rotatably provided on the left side of the placing part 28a. As a result, even if an undulation (a slight deformation in the vertical direction) is generated on the upper surface of the base plate 26 that corresponds to the installation surface IS on the floor, it is possible to move the slider 28 in the front-rear direction while absorbing the undulation. Therefore, according to the present embodiment, it is possible to stabilize the operation of the workpiece conveying wheeled platform 24.

The workpiece conveying wheeled platform 24 according to the present embodiment includes the slider 28 that is movable between the setup area SA and the pickup area GA, the guide mechanisms 32 and 38 that movably support the slider 28, and the drive mechanism 44 that moves the slider 28 in the predetermined direction described above. The slider 28 is recessed to form the placing part 28a for placing the pallet P. The guide mechanisms 32 and 38 are arranged on the both sides in the lateral direction orthogonal to the predetermined direction in the placing part 28a, respectively. The drive mechanism 44 is arranged on at least one side in the above-described lateral direction of the placing part 28a. Therefore, according to the workpiece conveying wheeled platform 24 related to the present embodiment, it is possible to shorten the height from the installation surface on the floor to the upper surface of the placing part 28a. Then, the stacking capacity of the workpieces W in the workpiece conveying wheeled platform 24 can be increased.

Since the stacking capacity of the workpieces W can be increased, the frequency of setting up the workpieces W for the workpiece conveying wheeled platform 24 can be reduced. As a result, the workability can be enhanced.

In addition, in the workpiece conveying wheeled platform 24 according to the present embodiment, the recessed depth of the placing part 28a is set to the depth corresponding to the height of the pallet P. Therefore, the pallet P can be easily placed on the placing part 28a, and the workability can be further enhanced.

In addition, in the workpiece conveying wheeled platform 24 according to the present embodiment, the placing part 28a is arranged close to the installation surface IS on the floor. Therefore, when the pallet P is placed on the placing part 28a (or when the pallet P is picked up from the placing part 28a), the vertical movement amount of the pallet P can be reduced and the workpieces W can be set up with the pallet jack HL.

Here, the notches 28n for allowing the forks HLa of the pallet jack HL to enter are formed on the placing part 28a. This fact also allows the vertical movement amount of the pallet P to be smaller, which makes the setup of the workpiece W by the pallet jack HL easy.

Further, since the auxiliary rollers 30 that roll on the installation surface IS on the floor are provided to the placing part 28a, it is possible to bring the lower surface of the placing part 28a close to the upper surface of the base plate 26 without bringing the slider 28 into contact with the base plate 26. As a result, the workability can be further improved.

In addition, the guide mechanisms 32 and 38 include the pair of the first guide mechanism 32 and the second guide mechanism 38. The first guide mechanism 32 includes the first guide rail 34 and the guide block 36 that are described above. The second guide mechanism 38 includes the second guide rail 40 and the guide roller 42 that are described above. Therefore, the slider 28 can be easily slid in the predetermined direction, and the workability can be further enhanced.

The working system 10 according to the present embodiment includes the working machine (the press brake) 12 for processing the workpiece W, the loading machine (the bending robot) 16 for supplying the workpiece W to the working machine 12, and the workpiece conveying wheeled platform 24 described above. Therefore, according to the working system 10 related to the present embodiment, the same effect as that of the workpiece conveying wheeled platform 24 described above is brought about.

Note that the present invention is not limited to the descriptions of the present embodiment described above. The present invention can be executed in various modes, for example, the technical idea applied to the bending system 10 can be applied to a working system other than the bending system 10. Then, the scope of rights included in the present invention is not limited to the embodiment described above.

The invention claimed is:

1. A workpiece conveying wheeled platform, comprising:
   a base plate installed on a floor in a vicinity of a loading machine for supplying a workpiece to a working machine;
   a slider movably provided on the base plate, the slider being movable in a predetermined direction between a setup area for setting up a plurality of workpieces stacked on a pallet and a pickup area for picking up an uppermost workpiece from among the plurality of workpieces with the loading machine, the slider being recessed to form a placing part for placing the pallet;
   guide mechanisms respectively arranged on both sides in a lateral direction orthogonal to the predetermined direction in the placing part of the slider and configured to support the slider so as to be movable in the predetermined direction, each of the guide mechanisms including a guide rail provided on the base plate to extend in the predetermined direction and a guided element movable along the respective guide rail while being guided by the respective guide rail; and a drive mechanism arranged on at least one side in the lateral direction of the placing part of the slider and configured to move the slider in the predetermined direction, wherein the placing part of the slider is adjacent to the base plate such that an upper surface of the placing part is located between the base plate and the respective guided element in a vertical direction.

2. The workpiece conveying wheeled platform according to claim 1, wherein a recessed depth of the placing part of the slider is set to a depth corresponding to a height of the pallet.

3. The workpiece conveying wheeled platform according to claim 1, wherein a notch for allowing a fork of a pallet jack to enter is formed on the placing part of the slider.

4. The workpiece conveying wheeled platform according to claim 1, further comprising an auxiliary roller provided to the placing part of the slider and configured to roll on the base plate.

5. The workpiece conveying wheeled platform according to claim 1, wherein the guide mechanisms include a pair of a first guide mechanism and a second guide mechanism, the first guide mechanism includes:

a first guide rail that serves as the guide rail and is provided, on the base plate, on one side in the lateral direction of the placing part of the slider, and extending in the predetermined direction; and a guide block that serves as the guided element and is provided on the one side in the lateral direction of the placing part of the slider, and configured to be guided by the first guide rail so as to be movable in the predetermined direction, and the second guide mechanism includes:

a second guide rail that serves as the guide rail and is provided, on the base plate, on another side in the lateral direction of the placing part of the slider, and extending in the predetermined direction; and a guide roller that serves as the guided element and is provided on the other side in the lateral direction of the placing part of the slider, and configured to roll on the second guide rail in the predetermined direction.

6. A working system, comprising:

a working machine configured to process a workpiece;

a loading machine configured to supply the workpiece to the working machine; and a workpiece conveying wheeled platform, comprising:

a base plate installed on a floor in a vicinity of a loading machine for supplying a workpiece to a working machine;

a slider movably provided on the base plate, the slider being movable in a predetermined direction between a setup area for setting up a plurality of workpieces stacked on a pallet and a pickup area for picking up an uppermost workpiece from among the plurality of workpieces with the loading machine, the slider being recessed to form a placing part for placing the pallet;

guide mechanisms respectively arranged on both sides in a lateral direction orthogonal to the predetermined direction in the placing part of the slider and configured to support the slider so as to be movable in the predetermined direction, each of the guide mechanisms including a guide rail provided on the base plate to extend in the predetermined direction and a guided element movable along the respective guide rail while being guided by the respective guide rail; and a drive mechanism arranged on at least one side in the lateral direction of the placing part of the slider and configured to move the slider in the predetermined direction, wherein the placing part of the slider is adjacent to the base plate such that an upper surface of the placing part is located between the base plate and the respective guided element in a vertical direction.

* * * * *